United States Patent
Pelis et al.

(10) Patent No.: US 8,402,183 B2
(45) Date of Patent: Mar. 19, 2013

(54) SYSTEM AND METHOD FOR COORDINATING CONTROL SETTINGS FOR HARDWARE-AUTOMATED I/O PROCESSORS

(75) Inventors: Nick Pelis, Durango, CO (US); Larry Rawe, Colorado Springs, CO (US)

(73) Assignee: LSI Corporation, San Jose, CA (US)

( * ) Notice: Subject to any disclaimer, the term of this patent is extended or adjusted under 35 U.S.C. 154(b) by 119 days.

(21) Appl. No.: 12/899,104

(22) Filed: Oct. 6, 2010

(65) Prior Publication Data
US 2012/0089753 A1  Apr. 12, 2012

(51) Int. Cl.
*G06F 3/00* (2006.01)

(52) U.S. Cl. ............ 710/39; 710/8; 710/14; 710/36; 710/38; 710/62; 710/72; 710/316; 709/250; 714/746; 716/100; 716/101; 716/102

(58) Field of Classification Search .................. None
See application file for complete search history.

(56) References Cited

U.S. PATENT DOCUMENTS

| | | | | |
|---|---|---|---|---|
| 6,772,268 B1 * | 8/2004 | Kristiansen et al. | ......... | 710/308 |
| 6,968,291 B1 * | 11/2005 | Desai | ............. | 702/182 |
| 7,167,926 B1 * | 1/2007 | Boucher et al. | ............. | 709/250 |
| 7,167,927 B2 * | 1/2007 | Philbrick et al. | ............. | 709/250 |
| 7,191,241 B2 * | 3/2007 | Boucher et al. | ............. | 709/230 |
| 7,284,070 B2 * | 10/2007 | Boucher et al. | ............. | 709/250 |
| 7,353,306 B2 * | 4/2008 | Thorpe et al. | ............. | 710/74 |
| 7,389,462 B1 * | 6/2008 | Wang et al. | ............. | 714/748 |
| 7,403,542 B1 * | 7/2008 | Thompson | ............. | 370/474 |
| 7,460,473 B1 * | 12/2008 | Kodama et al. | ............. | 370/230 |
| 7,496,689 B2 * | 2/2009 | Sharp et al. | ............. | 709/250 |
| 7,631,107 B2 * | 12/2009 | Pandya | ............. | 709/250 |
| 7,664,868 B2 * | 2/2010 | Boucher et al. | ............. | 709/230 |
| 7,694,024 B2 * | 4/2010 | Philbrick et al. | ............. | 709/250 |
| 7,869,355 B2 * | 1/2011 | Kodama et al. | ............. | 370/230 |
| 2002/0120914 A1 * | 8/2002 | Gupta et al. | ............. | 716/17 |
| 2009/0073884 A1 * | 3/2009 | Kodama et al. | ............. | 370/235 |
| 2010/0235465 A1 * | 9/2010 | Thorpe et al. | ............. | 709/217 |

OTHER PUBLICATIONS

'Programming the data path in network processor-based routers' by Michael E. Kounavis et al., copyright 2005, John Wiley & Sons, Ltd.*
Wikipedia's article 'Flag (computing)' from Wikipedia.org, posted May 29, 2010.*

* cited by examiner

*Primary Examiner* — Steven Snyder
(74) *Attorney, Agent, or Firm* — Kermit D. Lopez; Luis M. Ortiz; Kevin Soules

(57) ABSTRACT

A system and method for coordinating control setting with respect to an automated input/output (I/O) processor. A state machine having a transition algorithm can be configured in association with a storage controller in order to permit multiple entities to safely transmit an I/O request to an I/O device. Specific combinations of control bits associated with a fast path engine can be determined by identifying different modes with respect to the behavior of the fast path engine. Each mode can be assigned as a state with respect to the state machine. An I/O path exception and error condition that can cause transitions between the states can be determined and the transitions can be assigned from one state to another state. A generic logic template can then be configured to govern the transitions with respect to the state machine. The logic can be executed when an event occurs in order to trigger multiple state transition and/or modifications with respect to the hardware control bits of the fast path engine.

18 Claims, 17 Drawing Sheets

510

| STATE NAME | Fast-Path Engine Control Bits | | | | | | State Properties | | |
|---|---|---|---|---|---|---|---|---|---|
| | Fast-Path Capable | FP_ENABLED | FORCE_PEND | ZERO_IOCOUNT_EVENT | ForceIoPath | AUTO_PEND | Advancement Allowed | Force HW Settings | Firmware Can Send IOs |
| INELIGIBLE | 0 | X | X | X | X | X | 0 | 0 | 1 |

Description: The initial, default state for all (fast-path and non fast-path) devices. In this mode, neither the fast path engine nor the SAS Core are configured to accept fast-path IOs for the device. However, firmware is permitted to issue device IOs to the SAS core.

<u>INELIGIBLE State Transition Table:</u>

| Destination State | Exit Criteria |
|---|---|
| ACTIVE | Fast-Path Capable == 1 &&! Received ON_DISABLING_IO_PATH_BIT_SET |
| DISABLED | Fast-Path Capable == 1 && Received ON_DISABLING_IO_PATH_BIT_SET |

| STATE NAME | Fast-Path Engine Control Bits | | | | | | State Properties | | |
|---|---|---|---|---|---|---|---|---|---|
| | Fast-Path Capable | FP_ENABLED | FORCE_PEND | ZERO_IOCOUNT_EVENT | ForceIoPath | AUTO_PEND | Advancement Allowed | Force HW Settings | Firmware Can Send IOs |
| ACTIVE | 1 | 1 | 0 | X | 0 | 0 | 0 | 0 | 0 |

Description: The 'normal' state for a fast-path capable device. In this state, the fast path engine processes all IOs for a device and firmware is not involved in either the start or completion IO paths. Furthermore, firmware is forbidden from directly submitting device IOs to the SAS core, although it may do so indirectly through the fast path engine's IOP Request FIFO.

<u>ACTIVE State Transition Table:</u>

| Destination State | Exit Criteria |
|---|---|
| INELIGIBLE | Fast-Path Capable == 1 &&! Received ON_DISABLING_IO_PATH_BIT_SET. |
| DISABLED | Fast-Past Capable == 0. |
| MANAGING | Received ON_TASK_MGMT_ACTIVE && TaskMgmt == 1. |
| POSTPONING | (Received ON_POSTPONING_IO_PATH_BIT_SET II Received ON_RCVD_AUTO_PEND_EVENT II Received ON_RCVD_ZERO_IOCOUNT_EVENT II Received ON_RCVD_NONAUTO_SCSI_IO) && TaskMgmt ==0 |

| STATE NAME | Fast-Path Engine Control Bits | | | | | | State Properties | | |
|---|---|---|---|---|---|---|---|---|---|
| | Fast-Path Capable | FP_ENABLED | FORCE_PEND | ZERO_IOCOUNT_EVENT | ForceIoPath | AUTO_PEND | Advancement Allowed | Force HW Settings | Firmware Can Send IOs |
| POSTPONING | 1 | 1 | 1 | 1 | 0 | 0 | 1 | 0 | 0 |

Description: This state is entered when firmware needs the fast-path engine to stop sending IOs to a fast-path device, such as when a non-automated SCSI IO is waiting to be sent to a SATA drive. Upon entering this state, firmware instructs the fast path engine to pend new fast-path IOs and then waits for the outstanding IOCount to drop to zero before proceeding to the next state, POSTPONED. While waiting in POSTPONING state, firmware is not allowed to submit device IOs to the SAS core.

POSTPONING State Transition Table:

| Destination State | Exit Criteria |
|---|---|
| POSTPONED | ((FORCE_PEND==1 \|\| AUTO_PEND==1) && (Received ZERO_IOCOUNT_EVENT \|\| IoCount==0)) \|\| Received ON_TASK_MGMT_ACTIVE |

| STATE NAME | Fast-Path Engine Control Bits | | | | | | State Properties | | |
|---|---|---|---|---|---|---|---|---|---|
| | Fast-Path Capable | FP_ENABLED | FORCE_PEND | ZERO_IOCOUNT_EVENT | ForceIoPath | AUTO_PEND | Advancement Allowed | Force HW Settings | Firmware Can Send IOs |
| POSTPONED | 1 | 1 | 1 | 0 | 0 | 0 | 1 | 0 | 1 |

Description: In this state, the fast-path engine is pending all new IOs it receives and any previously submitted IOs have completed to the host. In this state, firmware is allowed to submit IOs to the SAS core while Cuda is blocked. POSTPONED is typically used with SATA devices to send a non-automated SCSI command to a SATA drive or transmit a CLOSE (CLEAR AFFILIATION) primitive to the device's parent expander.

POSTPONED State Transition Table:

| Destination State | Exit Criteria |
|---|---|
| MANAGING | Received ON_TASK_MGMT_ACTIVE && TaskMgmt == 1. |
| DISABLED | Received ON_CHANGED_DISABLING_IO_PATH_BIT. |
| INTERLEAVING | (Received ON_POSTPONING_IO_PATH_BIT) && FWPendCount != 0 && CudaPendCount != 0 && TaskMgmt == 0. |
| RESUMING | (Received ON_POSTPONING_IO_PATH_BITS_CLEARED) && FWPendCount == 0 && TaskMgmt == 0. |

| STATE NAME | Fast-Path Engine Control Bits | | | | | | State Properties | | |
|---|---|---|---|---|---|---|---|---|---|
| | Fast-Path Capable | FP_ENABLED | FORCE_PEND | ZERO_IOCOUNT_EVENT | ForceIoPath | AUTO_PEND | Advancement Allowed | Force HW Settings | Firmware Can Send IOs |
| INTERLEAVING | 1 | 1 | 1 | 1 | 0 | 1 | 1 | 1 | 0 |

Description: For a SATA device, the state machine may transition to this state upon exiting from POSTPONED state. The transition occurs after firmware has finished a non-automated SCSI IO and detected one or more pending IOs on both the fast path engine's and firmware's pending IO lists. In order to service IOs from both pending lists fairly, firmware utilizes the fast-path engine's AUTO_PEND mechanism to service a block of automated, fast-path IOs before returning to the next non-automated, slow-path pending IO.

INTERLEAVING State Transition Table:

| Destination State | Exit Criteria |
|---|---|
| ACTIVE | Always. |

| STATE NAME | Fast-Path Engine Control Bits | | | | | | State Properties | | |
|---|---|---|---|---|---|---|---|---|---|
| | Fast-Path Capable | FP_ENABLED | FORCE_PEND | ZERO_IOCOUNT_EVENT | ForceIoPath | AUTO_PEND | Advancement Allowed | Force HW Settings | Firmware Can Send IOs |
| MANAGING | 1 | X | X | X | 1 | X | 1 | 1 | 0 |

Description: This state is the main task management entry point and is transitioned to whenever the number of outstanding task management request for fast-path device increases from 0 to 1. This state asserts the ForceIoPath bit in the SAS core's device table, which redirects all IO completions for the device to firmware. This allows firmware to intercept completing IOs and block their progress to the host if they are on a task management's aborted IO list.

<u>MANAGING State Transition Table:</u>

| Destination State | Exit Criteria |
|---|---|
| DISABLED | Always. |

| STATE NAME | Fast-Path Engine Control Bits | | | | | | State Properties | | |
|---|---|---|---|---|---|---|---|---|---|
| | Fast-Path Capable | FP_ENABLED | FORCE_PEND | ZERO_IOCOUNT_EVENT | ForceIoPath | AUTO_PEND | Advancement Allowed | Force HW Settings | Firmware Can Send IOs |
| Disabled | 1 | 0 | 0 | 0 | X | 0 | 1 | 1 | 1 |

Decription: This state is entered when firmware needs to temporarily disable fast-path support for a device, which could be due to a task management request or critical IO path exception. While in this state, any new or pended IOs processed by the fast path engine are rejected to firmware via the Exception Post FIFO. In this state, firmware may directly and safely submit IOs to the SAS core for processing.

Disabled State Transition Table:

| Destination State | Exit Criteria |
|---|---|
| INELIGIBLE | Fast-Path Capable == 0 |
| MANAGED | Received ON_TASK_MGMT_ACTIVE && TaskMgmt == 1 |
| POSTPONED | (No Disabling IO Path Bits Set) && Received ON_CHANGED_POSTPONING_IO_BIT && TaskMgmt == 0 |
| RESUMING | (No Disabling IO Path Bits Set) && No Postponing IO Path Bits Set && TaskMgmt == 0 |

*FIG. 12*

| STATE NAME | Fast-Path Engine Control Bits | | | | | | State Properties | | |
|---|---|---|---|---|---|---|---|---|---|
| | Fast-Path Capable | FP_ENABLED | FORCE_PEND | ZERO_IOCOUNT_EVENT | ForceIoPath | AUTO_PEND | Advancement Allowed | Force HW Settings | Firmware Can Send IOs |
| MANAGED | 1 | 0 | 0 | 0 | 1 | 0 | 0 | 0 | 1 |

Decription: This state is entered from DISABLED whenever there is at least one task management request outstanding to the device. Firmware is still allowed to submit IOs to the SAS core for processing provided those IOs are not within the scope of any outstanding TM requests.

<u>MANAGED State Transition Table:</u>

| Destination State | Exit Criteria |
|---|---|
| RESUMING | Received ON_TASK_MGMT_INACTIVE. |

| STATE NAME | Fast-Path Engine Control Bits | | | | | | State Properties | | |
|---|---|---|---|---|---|---|---|---|---|
| | Fast-Path Capable | FP_ENABLED | FORCE_PEND | ZERO_IOCOUNT_EVENT | ForceIoPath | AUTO_PEND | Advancement Allowed | Force HW Settings | Firmware Can Send IOs |
| RESUMING | 1 | X | X | CCA? | X | 0 | 1 | 1 | 0 |

Decription: This state is entered when firmware needs to resume normal fast path engine operation after having previously been in POSTPONED, DISABLED, or MANAGED state. Firmware performs a sanity check to ensure it is safe to re-enable fast-path device support before transitioning back to ACTIVE state. Additionally, if the firmware feature is enabled, the fast-path engine is primed to generate a ZERO_IOCOUNT_EVENT the next time the outstanding IO count drops to zero. This allows a CLOSE (CLEAR AFFILIATION) to be sent to an expander-attached SATA drive and clear the drive's affiliation between the controller and expander.

<u>RESUMING State Transition Table:</u>

| Destination State | Exit Criteria |
|---|---|
| DISABLED | (Any Disabling IO Path Bits Set) // Received ON_CHANGED_DISABLING_IO_BIT_SET. |
| POSTPONED | (No Disabling IO Path Bits Set // Received ON_CHANGED_DISABLING_IO_BITS_CLEARED) && (Any Postponing IO Path Bits Set // Received ON_CHANGED POSTPONING_IO_BIT_SET)) |
| ACTIVE | (No Disabling IO Path Bits Set // Received ON_CHANGED_POSTONING_IO_BITS_CLEARED) && (No Postponing IO Path Bits Set // Received ON_CHANGED POSTPONING_IO_BITS_CLEARED)) && TaskMgmt ==0. |

*FIG. 14*

SYSTEM AND METHOD FOR COORDINATING CONTROL SETTINGS FOR HARDWARE-AUTOMATED I/O PROCESSORS

TECHNICAL FIELD

Embodiments are generally related to input/output (I/O) processing systems and methods. Embodiments are also related to small computer system interface (SCSI) controller and/or serial attached SCSI (SAS) controllers. Embodiments are additionally related to methods for coordinating control settings with respect to an I/O processor.

BACKGROUND OF THE INVENTION

Storage controllers such as, for example, SCSI and serial attached SAS controllers represent a set of standards for physically connecting and transferring data between computers and peripheral devices. The SCSI standards, for example, define commands, protocols, and electrical and optical interfaces. SAS controllers typically employ a serial, point-to-point topology to overcome performance barriers associated with a storage device based on a parallel bus or arbitrated loop architecture.

Conventionally, an embedded firmware associated with a LSI storage controller is responsible for starting and completing all SCSI I/Os from a host driver/operating system. The SAS controller raises an interrupt to notify the firmware regarding the arrival of a new I/O request when the host submits the I/O request to a SAS controller message unit. The firmware services the interrupt, validates the SCSI I/O request, verifies that a target device is capable of accepting the I/O, and then interfaces with a SAS core to transmit a command frame to the target device and initiate data transfer. Once data transfer completes, the target device will return a response frame to the controller, causing the SAS core to raise a completion interrupt. The firmware further services such completion interrupts and subsequently interfaces with the messaging unit to pass a response back to the host.

Some prior art storage controllers may include, for example, a fast path engine hardware functionality that permits the SCSI I/O requests and completions to flow back and forth between the messaging unit and the SAS core without any firmware involvement and/or knowledge. The majority of prior art controllers, however, do not include fast path engine hardware. An I/O path and error condition with respect to such storage controller includes, for example, an active task management cleanup for the device, handling certain types of I/O requests not automated by the hardware, sending certain kinds of primitives to the SATA devices, and some types of I/O path exceptions (e.g., when a device briefly goes missing from the SAS topology). Such SAS topology conditions and device errors however, periodically require the SAS controller's firmware to take control of the fast I/O path and re-direct the flow of I/Os through firmware. Additionally, such an approach is not capable of controlling the device I/O path when multiple entities submit I/O request simultaneously.

A state machine can be alternatively adopted for each firmware in order to clear the I/O path exceptions and to directly manage corresponding fast path engine hardware control settings. Such an approach additionally requires an enormous amount of tracking logic to handle scenarios when multiple types of I/O path exceptions occur. Because the firmware associated with the SAS controller is spread across multiple software modules/source files and maintained by multiple engineers simultaneously, such approach, however, leads to increased number of software bugs and invite development of difficult-to-maintain "spaghetti code".

Based on the foregoing, it is believed that a need exists for an improved system and method for coordinating control settings with respect to an automated input/output (I/O) processor. A need also exists for configuring a state machine to control an I/O path with respect to multiple entities, as described in greater detail herein.

BRIEF SUMMARY

The following summary is provided to facilitate an understanding of some of the innovative features unique to the disclosed embodiment and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an improved storage controller system and method.

It is another aspect of the disclosed embodiments to provide for an improved system and method for coordinating control settings with respect to an automated input/output (I/O) processor.

It is a further aspect of the disclosed embodiment to provide for an improved method for configuring a state machine to control an I/O path with respect to multiple entities.

The aforementioned aspects and other objectives and advantages can now be achieved as described herein. A system and method for coordinating control setting with respect to an automated input/output (I/O) processor is disclosed herein. A state machine having a transition algorithm can be configured in association with a storage controller (e.g., serial attached SCSI (SAS) controller) in order to permit multiple entities (e.g., firmware, fast path engine) to safely transmit an I/O request to an I/O device. Specific combinations of control bits associated with a fast path engine can be determined by identifying different modes with respect to the behavior of the fast path engine. Each mode can be assigned as a state with respect to the state machine. An I/O path exception and error condition that can cause transitions between the states can be determined and the transitions can be assigned from one state to another state. A generic logic template can then be configured to govern the transitions with respect to the state machine. The logic can be executed when an event occurs in order to trigger multiple state transition and/or modifications with respect to the hardware control bits of the fast path engine.

The state machine permits the SAS controller firmware to transit back and forth between varying types of fast path engine behavior as the I/O device exceptions and errors occurs. The transition states with respect to the state machine include an ineligible state, an active state, a postponing state, a postponed state, an interleaving state, a managing state, a disabled state, and a resuming state. In the ineligible state, neither the fast path engine nor a SAS core can be configured to accept a fast path I/O and the firmware can be permitted to issue the device I/O to the SAS core. The normal state of the state machine permits the fast path engine to process I/Os without the involvement of the firmware. The state machine enters the postponing state when the firmware requires the fast path engine to stop sending I/Os to the device. The postponed state postpones the pending I/Os and previously submitted I/Os with respect to the fast path engine in order to permit the firmware to submit I/Os to the SAS core.

The state machine can transit to the interleaving state upon exiting from the postponed state. Such transition occurs after the firmware finishes a non-automated SCSI I/O and detects one or more pending I/Os on both the fast path engine and the firmware pending I/O list. The managing state is a main task management entry point and is transitioned to whenever the number of outstanding task management requests for the device increases from 0 to 1. The state machine enters into the disabled state when the firmware needs to temporarily disable the fast path engine support for the device due to a task management request and/or a critical I/O path exception. The state machine enters the managed state from the disabled state when there is at least one task management request outstanding to the device. Similarly, the state machine enters the resuming state when the firmware needs to resume normal fast path engine operation after having previously been in the postponed, disabled, and/or managed state.

The transition algorithm can be employed to transfer shared ownerships of the I/O path to and from the firmware as the I/O path exception occurs. The SAS controller further adds the I/O exceptions and errors to the fast path engine by identifying and inserting new inputs into the state machine logic. The template can be designed such that a single event can trigger multiple state transitions and/or modifications to the fast path engine control bits. The state machine provides a simple and straight forward approach that permits increased flexibility in the hardware control bits that the firmware can mange. Such an approach effectively provides smooth and deterministic transitions between the fast path engine and the firmware associated with the SAS controller.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

FIGS. 6-14 illustrate state transition tables with respect to the state machine, in accordance with the disclosed embodiments.

DETAILED DESCRIPTION

The particular values and configurations discussed in these non-limiting examples can be varied and are cited merely to illustrate at least one embodiment and are not intended to limit the scope thereof.

Figure 1:
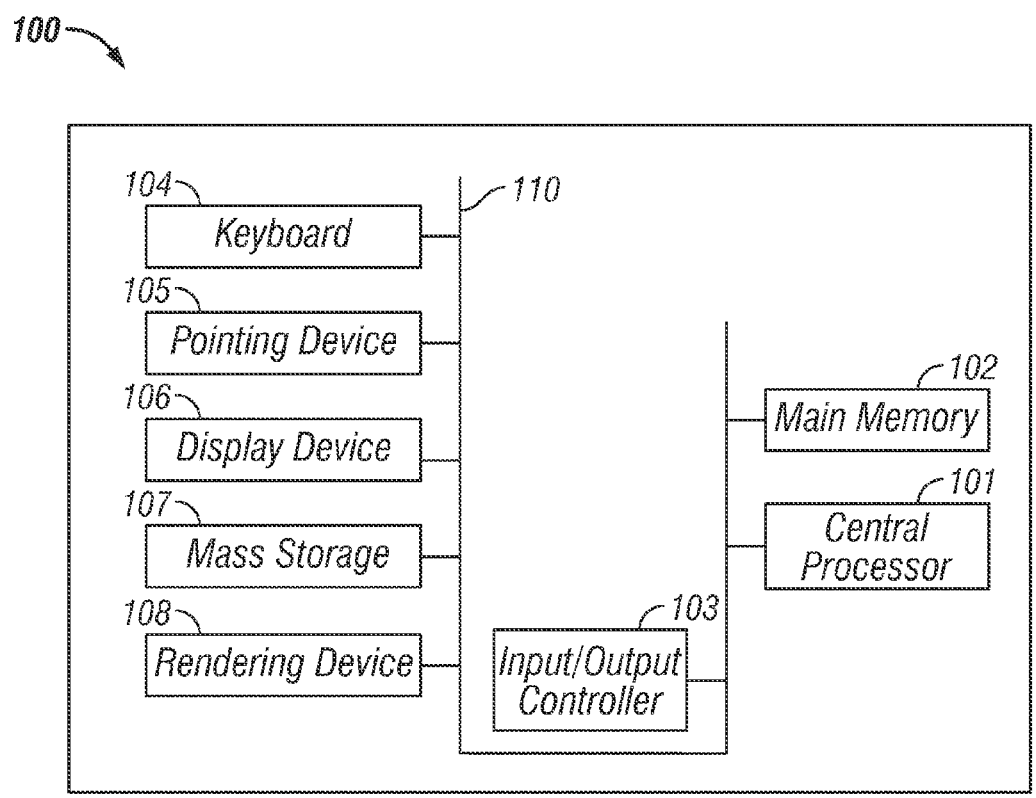
FIG. 1 illustrates a schematic view of a data-processing system in which an embodiment may be implemented.

FIG. 1 is provided as an exemplary diagram of data-processing environments in which embodiments of the present invention may be implemented. It should be appreciated that FIG. 1 is only exemplary and is not intended to assert or imply any limitation with regards to the environments in which aspects or embodiments of the disclosed embodiments may be implemented. Many modifications to the depicted environments may be made without departing from the spirit and scope of the disclosed embodiments.

As illustrated in FIG. 1, the disclosed embodiments may be implemented in the context of a data-processing system 100 that includes, for example, a central processor 101, a main memory 102, an input/output controller 103, a keyboard 104, an input device 105 (e.g., a pointing device such as a mouse, track ball, pen device, etc), a display device 106, and a mass storage 107 (e.g., a hard disk). Additional input/output devices, such as a rendering device 108 (e.g., printer, scanner, fax machine, etc), for example, may be associated with the data-processing system 100 as desired. As illustrated, the various components of data-processing system 100 can communicate electronically through a system bus 110 or similar architecture. The system bus 110 may be, for example, a subsystem that transfers data between, for example, computer components within data-processing system 100 or to and from other data-processing devices, components, computers, etc. Note that the configuration depicted in FIG. 1 is presented here for general illustrative and contextual information only and is not considered a limiting feature of the disclosed embodiments.

Figure 2:
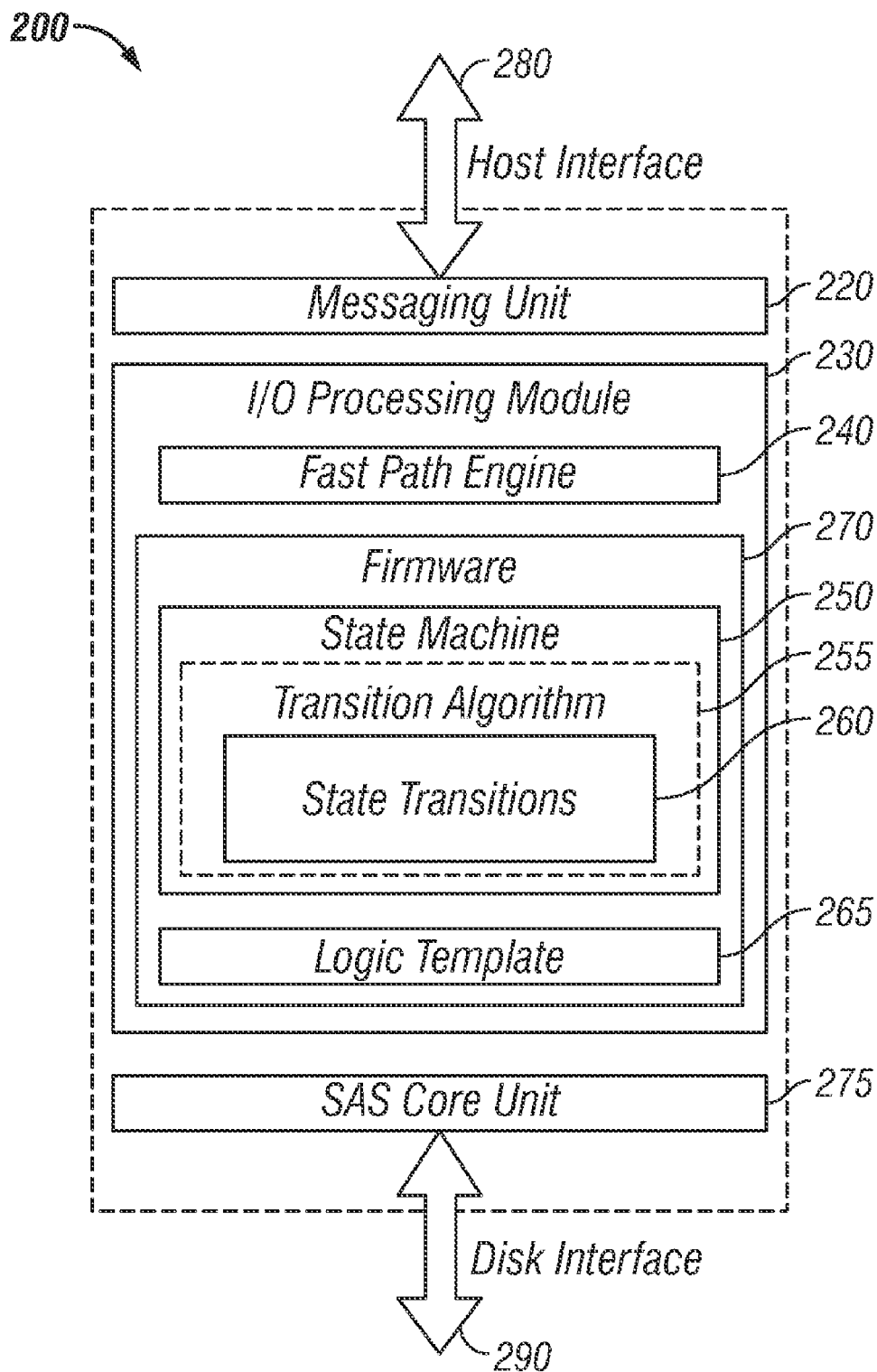
FIG. 2 illustrates a block diagram of a storage controller associated with a state machine for coordinating control settings with respect to an automated I/O processor, in accordance with the disclosed embodiments.

FIG. 2 illustrates a block diagram of a storage controller 200 associated with a state machine 250, in accordance with the disclosed embodiments. The controller 200 may be configured to support one or more data storage standards supported by various storage devices. For example, when the controller 200 is a SAS/SATA controller, the controller 200 may control SAS storage devices and/or SATA storage devices. It can be appreciated, however, that such embodiments can be implemented in the context of other storage controllers, depending upon design considerations.

The SAS controller 200 can be an intelligent I/O processor with an operating environment specialized for storage (e.g., the I/O processor includes a firmware/software for applications such as RAID and SCSI systems). The SAS controller 200 physically connects and transfers data between the data-processing system 100 and a peripheral device. In certain embodiments, the SAS controller 200 is attached to a wide area network (WAN), such as an Internet, and communicates with the I/O devices via an SCSI protocol.

The SAS controller 200 includes a messaging unit 220, the I/O processing module 230, and a SAS core unit 275. The I/O processing module 230 further includes a fast path engine 240, a SAS controller firmware 270, and the state machine 250. The state machine 250 associated with the I/O processing module 230 can be configured with a transition algorithm 255 for generating the transition states 260 with respect to the SAS controller 200. The following discussion is intended to provide a brief, general description of suitable computing environments in which the system and method may be implemented. Although not required, the disclosed embodiments will be described in the general context of computer-executable instructions, such as program modules, being executed by a single computer. In most instances, a "module" constitutes a software application.

Generally, program modules include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines; and an implementation, which is typically private (accessible only to that module) and which includes source code that actually implements the routines in the module. The term module may also simply refer to an application such as a computer program designed to assist in the performance of a specific task such as word processing, accounting, inventory management, etc.

The state machine 250 typically permits multiple entities such as, for example, the firmware 270 and the fast path engine 240 associated with the SAS controller 200 to safely transmit an I/O request to an I/O device. It should be appreciated that I/O device may be any type of data processing system 100 such as, for example, a personal computer, laptop computer, network computer, server, router, expander, set-top box, mainframe, storage device, hard disk drive, flash memory, floppy drive, compact disk read-only memory (CD-ROM), digital video disk (DVD), flash memory, hand-held personal device, and cell phone, etc.

Specific combinations of control bits associated with the fast path engine 240 can be determined by identifying different modes of behavior of the fast path engine 240. Each mode can be assigned as a transition state 260 with respect to the state machine 250. In general, the state machine 250 represents a mathematical abstraction sometimes employed to design digital logic or computer programs. The state machine 250 determines the I/O path exception and error conditions that can cause transitions between the states 260 and assigns the transitions from one state to another state. A generic logic "template" 265 associated with the state machine 250 governs the transitions 260 in the state machine 250 and executes the logic 265 when an event occurs in order to trigger multiple state transitions 260 and/or modifications to the hardware control bits of the fast path engine 240.

FIGS. 1-2 are thus intended as an example and not as an architectural limitation with respect to particular embodiments. Such embodiments, however, are not limited to any particular application or any particular computing or data-processing environment. Instead, those skilled in the art will appreciate that the disclosed system and method may be advantageously applied to a variety of system and application software. Moreover, the present invention may be embodied on a variety of different computing platforms including Macintosh, UNIX, LINUX, and the like.

Figure 3:
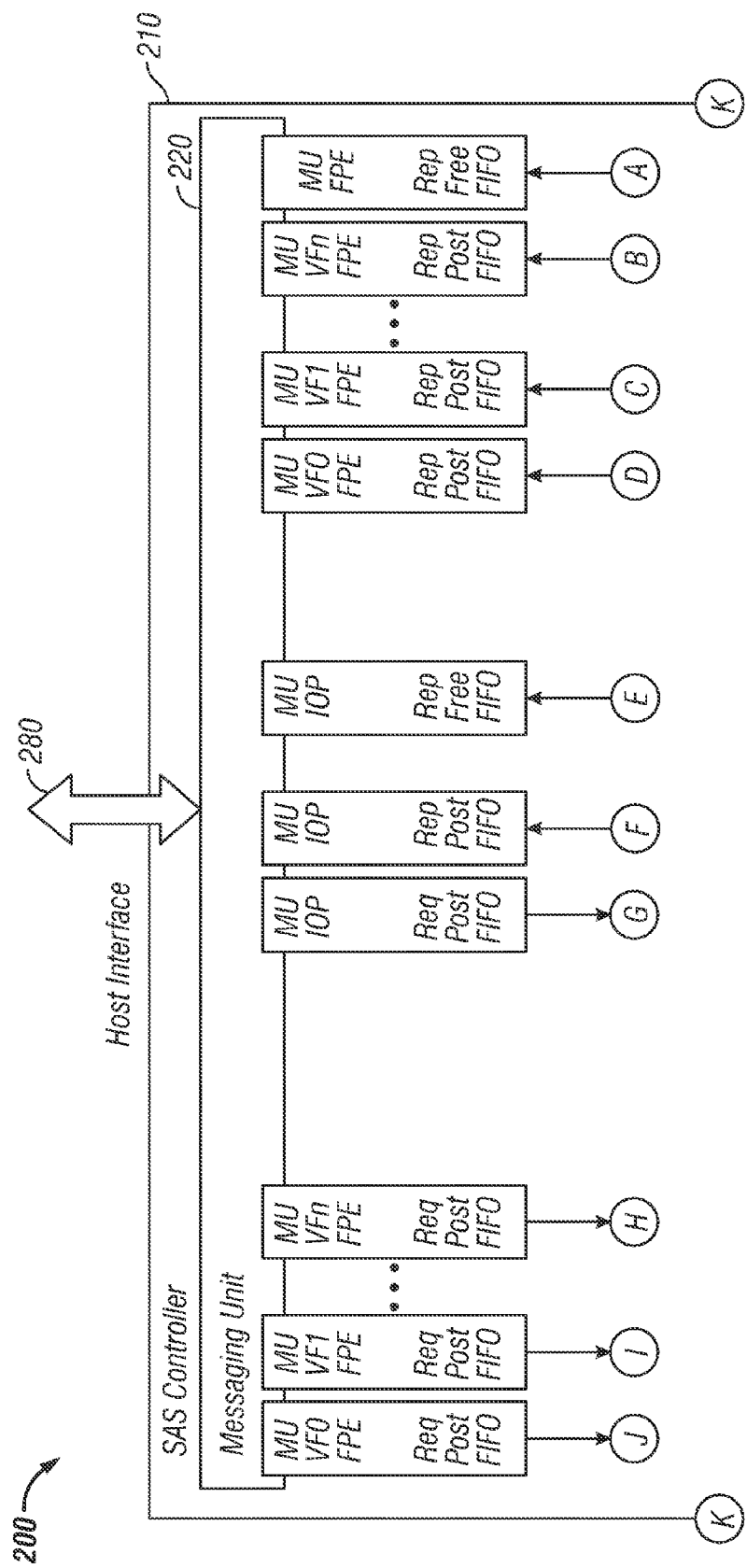
FIG. 3 and FIG. 3A illustrate a schematic diagram of the storage controller, in accordance with the disclosed embodiments.
Figure 3A:
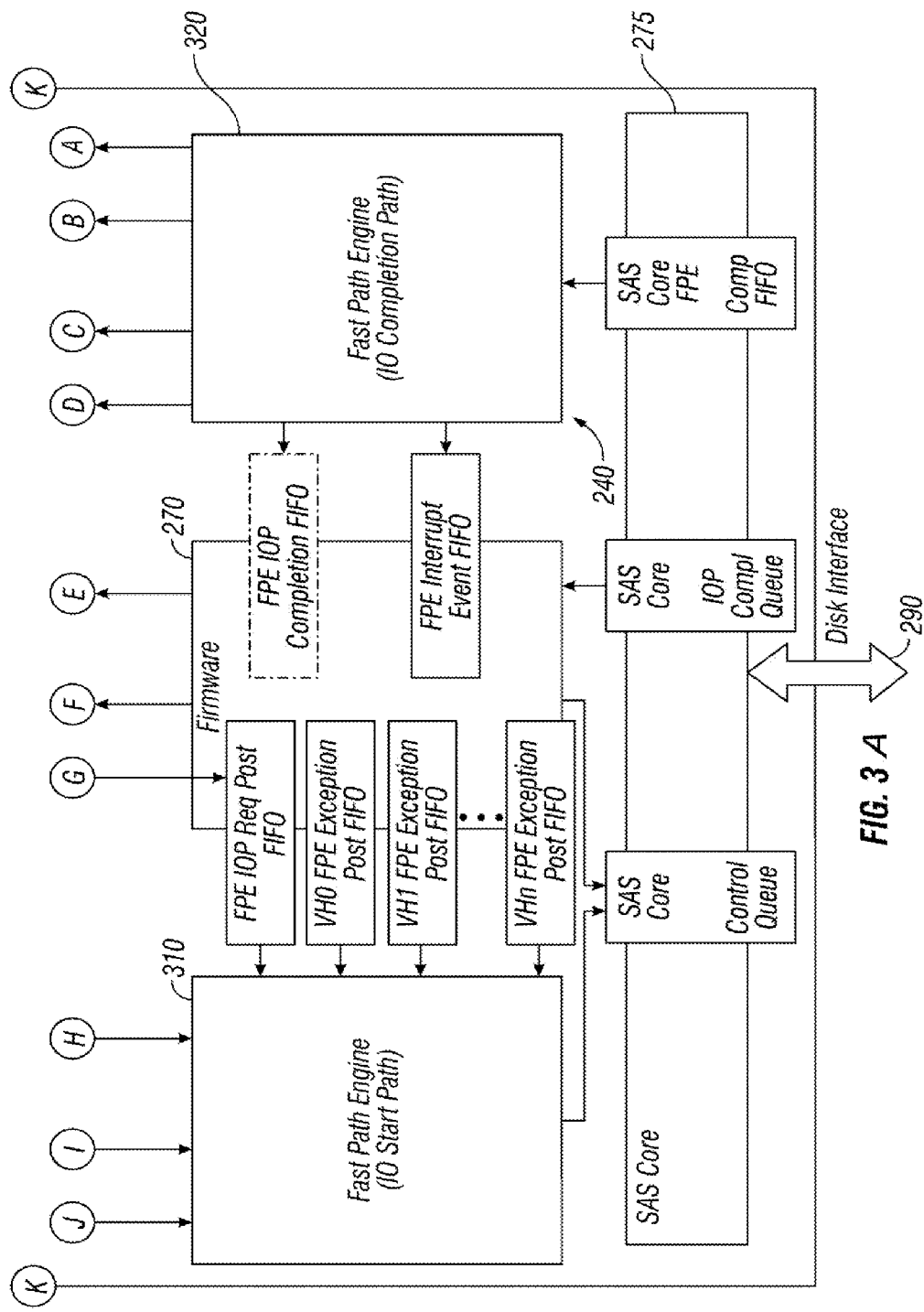

FIG. 3 illustrates a schematic diagram of the storage controller 200, in accordance with the disclosed embodiments. Note that in FIGS. 1-15, identical or similar blocks are generally indicated by identical reference numerals. The fast path engine 240 generally includes an I/O start path 310 and an I/O completion path 320. The fast path engine 240 provides increased system disk I/O performance by automatically pulling new I/O requests from a controller's host interface 280, submitting such requests to the SAS core 275 for processing, and forwarding notifications of the I/O completions to a host driver and/or an operating system via a disk interface 290. By receiving the SCSI I/O requests, the fast path engine 240 either starts the I/O processing by submitting the request to a control queue of the SAS core 275, defers the I/O for future processing by adding the I/O to an internally maintained queue, and/or rejects the I/O to the firmware 270 via an Exception Post FIFO queue. Similarly, a logic associated with the I/O completion path of the fast path engine 240 determines the completion of the I/O requests and routes the I/O completion to either the messaging unit 220 or the firmware 270 depending on the I/O entry point.

The firmware 270 optionally performs the functions of the fast path engine 240 by controlling and redirecting flow of I/Os based on SAS topology conditions and device errors. The firmware 270 is responsible for dividing host I/O operations into constituent disk drive commands according to the currently selected disk array configuration. The firmware 270 associated with the SAS controller 200 may store configuration information associated with unique IDs such as enclosure type, controller card type, and the like. The state machine 250 permits the SAS controller firmware 270 to transition back and forth between varying types of fast path engine behavior as the I/O device exceptions and errors occurs. The transition algorithm 255 associated with the state machine 250 transfers shared ownerships of the I/O path to and from the firmware 270 as I/O path exception occurs. The generic logic "template" 265 can be executed each time an event occurs that triggers the state machine 250. Such a behavior can be unique to each transition state 260 of the state machine 250 and is defined as unique properties.

The design of the firmware 270 can be extensible and adaptable. The I/O exceptions and errors in the SAS controller 200 are added to the fast path engine 240 in order to identify and insert new "inputs" into the sate transition logic "template" 265. Furthermore, the state transition logic permits one event to trigger multiple transitions by optionally applying a specific set of changes to the control bits of the fast path engine 240 on each transition state 260. Such behavior can be governed by the values of "Force Hardware Settings" and "Advancement Allowed" properties associated with each state 260 of the sate machine 250. Such an approach provides a simple and straight forward approach that permits improved flexibility in the fast path engine control bits.

Figure 4:
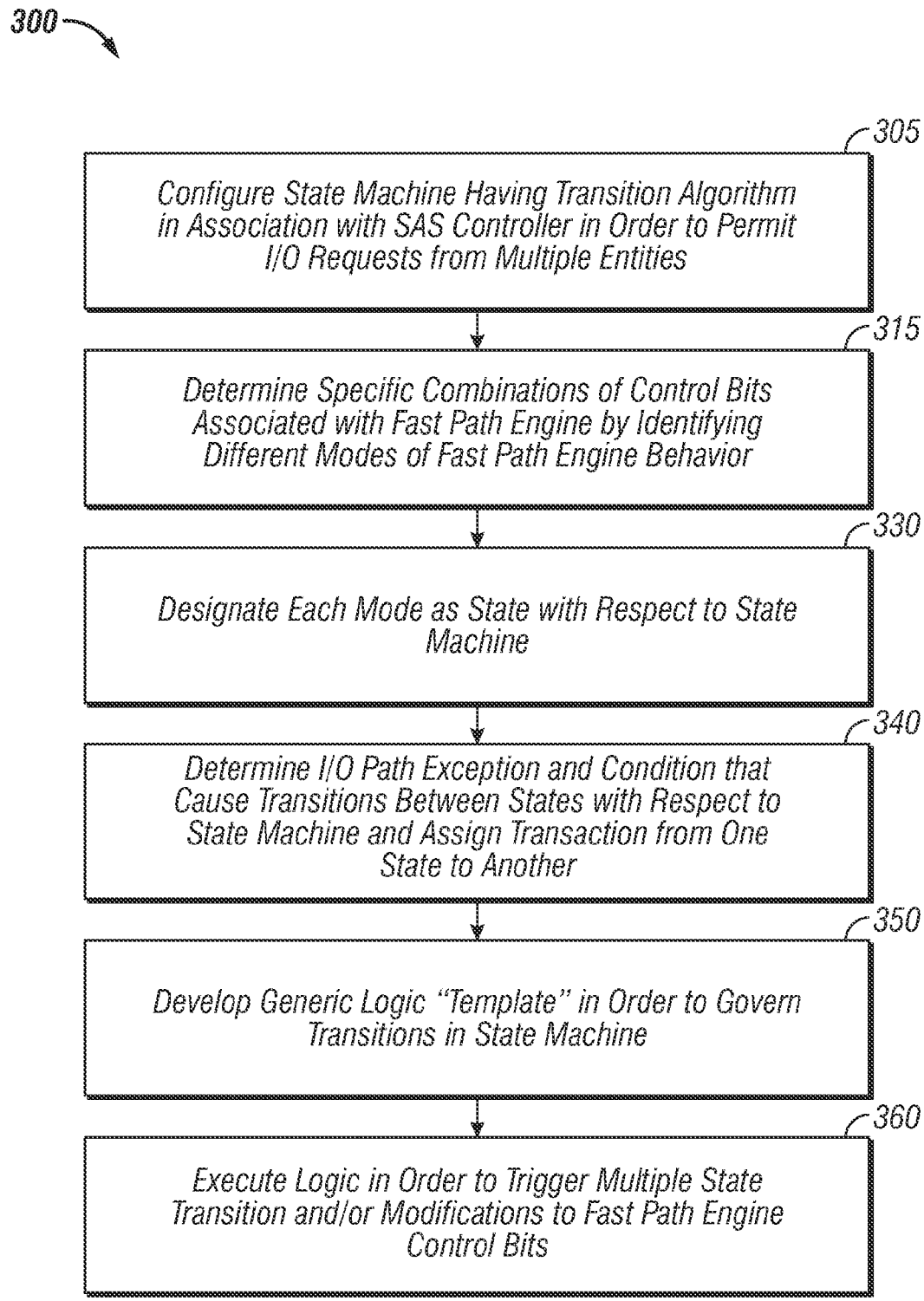
FIG. 4 illustrates a high level flow chart of operation illustrating logical operational steps of a method for coordinating control settings with respect to the hardware-automated I/O processor, in accordance with the disclosed embodiments.

FIG. 4 illustrates a high level flow chart of operation illustrating logical operational steps of a method 300 for coordinating control settings with respect to the automated input/output (I/O) processor. Note that the method 300 can be implemented in the context of a computer-useable medium that contains a program product including, for example, a module or group of modules. The state machine 250 is generally configured to include a transition algorithm 255, which can be configured in association with the SAS controller 200 in order to permit multiple entities to safely transmit an I/O request with respect to the device, as illustrated at block 305. Note that the entities disclosed herein can be such as the fast path engine 240 and the firmware 270 associated with the SAS controller 200. Thereafter, specific combinations of the control bits associated with the fast path engine 240 can be determined by identifying different modes of the fast path engine 240 via the state machine 250, as depicted at block 315.

Each mode of the fast path engine 240 can be further assigned as a unique transition state 260 with respect to the state machine 250, as indicated at block 330. The I/O path exception and error condition that causes transitions between the states 260 with respect to the state machine 250 can be determined and the transitions can be assigned from one state to another state, as depicted at block 340. The generic logic "template" 265 can be finally developed in order to govern the transitions in the state machine 250, as illustrated at block 350. The logic 265 can be executed when an event occurs in order to trigger multiple state transitions 260 and/or modifications to the hardware control bits of the fast path engine 240, as illustrated at block 360.

Figure 5:
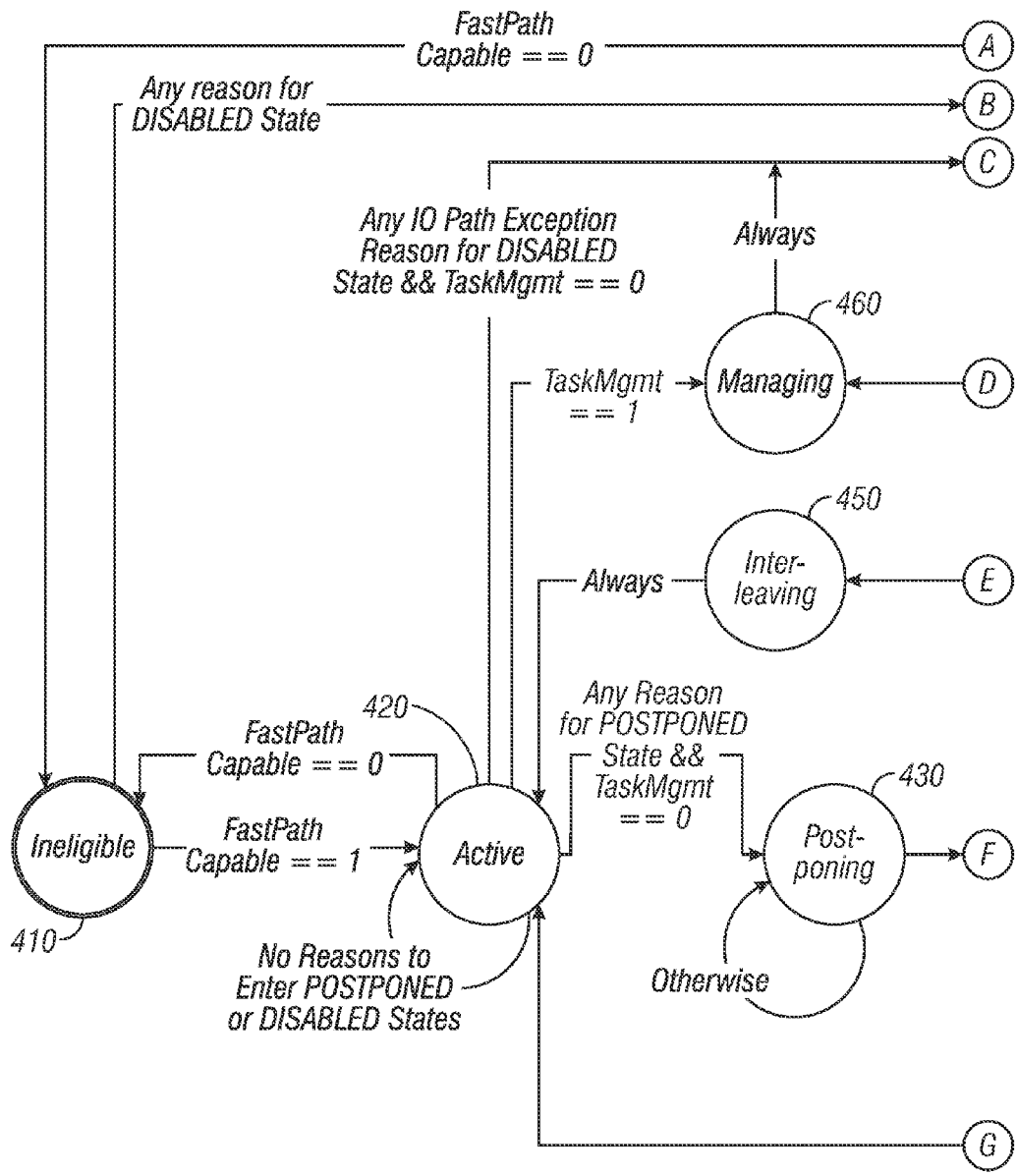
FIG. 5 and FIG. 5a illustrate a state machine diagram illustrating each state and respective transitions, in accordance with the disclosed embodiments.
Figure 5A:
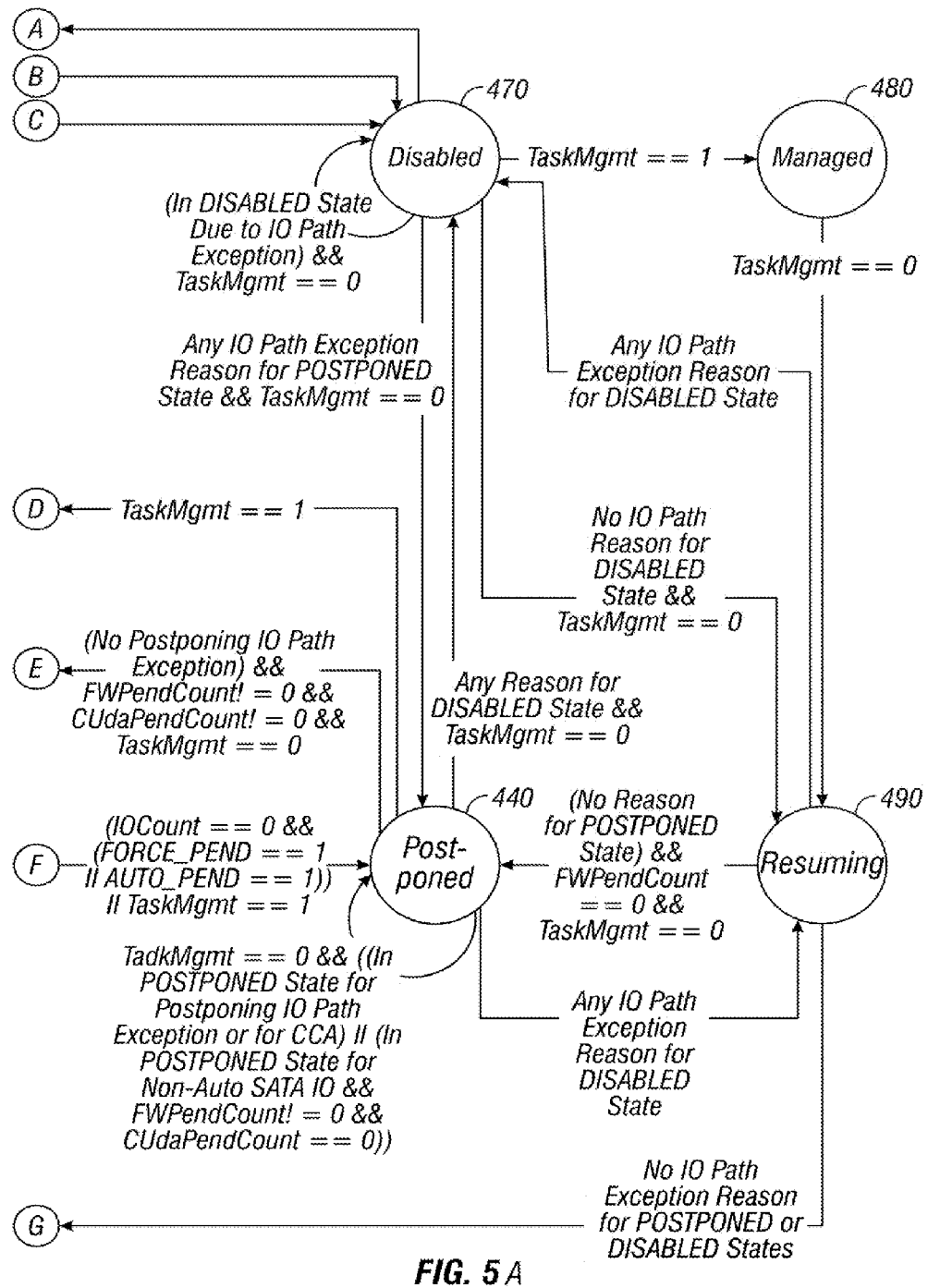

FIG. 5 illustrates a state machine diagram 400 illustrating each transition state 260 and respective transitions, in accordance with the disclosed embodiments. The state machine 250 is a behavior model composed of a finite number of states, transitions between those states, and actions, similarly to a flow graph in which one can inspect the way logic runs when certain conditions are met. It has finite internal memory, an input feature that reads symbols in a sequence, one at a time without going backward; and an output feature, which may be in the form of a user interface, once the model is implemented. The operation of the state machine 250 begins from one of the states (called a start state), goes through transitions depending on input to different states and can end in any of those available, however, only a certain set of states mark a successful flow of operation (called accept states).

The transition states 260 with respect to the state machine 250 include an ineligible state 410, an active state 420, a postponing state 430, a postponed state 440, an interleaving state 450, a managing state 460, a managed state 480, a disabled state 470, and a resuming state 490. Note that the state machine diagram 400 illustrated in FIG. 5, can be a programmed framework for designing and implementing the state machine 250 with in the automated I/O processor. The state machine 250 defines the states, conditions, actions, triggers, and transition states 260 with respect to the fast path engine 240 and the firmware 270 based on the I/O exceptions and errors conditions in the SAS controller 200.

FIGS. 6-14 illustrate state transition tables 510, 520, 530, 540, 550, 560, 570, 580, and 590 with respect to the state machine 250 associated with the SAS controller 200, in accordance with the disclosed embodiments. The transition tables 510-590 illustrate description of the transition states 260 within the state machine 250, the hardware control bits corresponding to each state 260, the properties of each state 260, and the state exit criteria. The transition states 260 with respect to the state machine 250 can be generated based on the control bits and their respective state properties within the fast path engine 240. The state transition table 510 illustrates the ineligible state 410 with respect to the state machine 250. The ineligible state 410 can be an initial default state with respect to all the devices in the automated I/O processor. In the ineligible state 410, neither the fast path engine 240 nor the SAS core 275 can be configured to accept I/Os from the messaging unit 220 of the controller 200 and the firmware 270 can be permitted to issue device I/Os to the SAS core 275.

The state transition table 520 illustrates the 'normal' active state 420 with respect to the state machine 250. The normal state 420 of the state machine 250 permits the fast path engine 240 to process I/Os. Furthermore, the firmware 270 is forbidden from directly submitting the device I/Os to the SAS core 275, although it may do so indirectly through the 'I/O Processor Request FIFO' of the fast path engine 240. The state transition table 530 illustrates the postponing state 430 with respect to the state machine 250. The state machine 250 enters the postponing state 430 when the firmware 270 needs the fast path engine 240 to stop transmitting I/Os to the device. For example, the state machine 250 enters the postponing state 430 when a non-automated SCSI I/O is waiting to be sent to SATA drive. Upon entering the postponing state 430, the firmware 270 instructs the fast path engine 240 to postpone the new fast-path I/Os and then waits for the outstanding IO Count to drop to zero before proceeding to the next state (i.e., the postponed state 440). Note that the firmware 270 is not permitted to submit the device I/Os to the SAS core 275 while waiting in the postponing state 430.

FIG. 9 illustrates a state transition table 540 illustrating the postponed state 440 with respect to the state machine 250, in accordance with the disclosed embodiments. The state machine 250 enters the postponed state 440 by postponing the pending I/Os and previously submitted I/Os with respect to the fast path engine 240 in order to permit the firmware 270 to submit I/Os to the SAS core 275. The postponed state 440 is typically employed in association with SATA devices to transmit the non-automated SCSI command to the SATA drive or transmit a CLOSE (clear affiliation) primitive to the device's parent expander. The state transition table 550 illustrates the interleaving state 450 with respect to the state machine 250. The state machine 250 can transit to the interleaving state 450 upon exiting from the postponed state 440. Such transition occurs after the firmware 270 finishes the non-automated SCSI I/O and detects one or more pending I/Os on both the fast path engine 240 and the firmware pending I/O list. In order to service I/Os from both the pending lists fairly, the firmware 270 employs an AUTO_PEND mechanism of the fast-path engine 240 to service a block of automated, fast-path I/Os before returning to the next non-automated, slow-path pending I/O.

The state transition table 560 illustrates the managing state 460 with respect to the state machine 250. The managing state 460 is a main task management entry point and is transitioned to whenever the number of outstanding task management requests for the device increases from 0 to 1. The managing state 460 with respect to the state machine 250 asserts the ForceIoPath bit in the SAS core's device table, which redirects all I/O completions for the device to the firmware 270. Such redirection of I/O complication permits the firmware 270 to intercept completing I/Os and block the progress of I/Os to the host if the I/Os are on a task management's aborted I/O list.

FIG. 12 illustrates a state transition table 570 illustrating the disabled state 470 with respect to the state machine 250, in accordance with the disclosed embodiments. The state machine 250 enters into the disabled state 470 whenever the firmware 270 needs to temporarily disable the fast path engine 240 support for the device due to the task management request and/or a critical I/O path exception. While the state machine 250 is in the disabled state 470, any new or pending I/Os processed by the fast path engine 240 are rejected to the firmware 270 via an 'Exception Post FIFO'. In such a state 470, the firmware 270 may directly and safely submit I/Os to the SAS core 275 for processing. The state transition table 580 illustrates the managed state 480 with respect to the state machine 250, in accordance with the disclosed embodiments. The state machine 250 enters the managed state 480 from the disabled state 470 whenever there is at least one task management request outstanding to the device. The firmware 270 is still permitted to submit I/Os to the SAS core 275 for processing I/Os that are not within the scope of any outstanding task management requests in the SAS controller 200.

FIG. 14 illustrates a state transition table 590 illustrating the resuming state 490 with respect to the state machine 250, in accordance with the disclosed embodiments. The state machine 250 enters the resuming state 490 whenever the firmware 270 needs to resume normal operations in the fast path engine 240 after having previously been in the postponed 440, disabled 470, and/or managed 480 states. In the resuming state 490, the firmware 270 performs a sanity check to ensure safety of re-enabling the support of the fast-path engine 240 before transitioning back to the normal state 420.

Additionally, if the firmware 270 feature is enabled, the fast-path engine 240 is primed to generate a 'ZERO_IO-COUNT_EVENT' the next time the outstanding I/O Count drops to zero. Such a state 490 permits a CLOSE (clear affiliation) to be sent to an expander-attached SATA drive and clear the drive's affiliation between the controller and expander.

Figure 15:
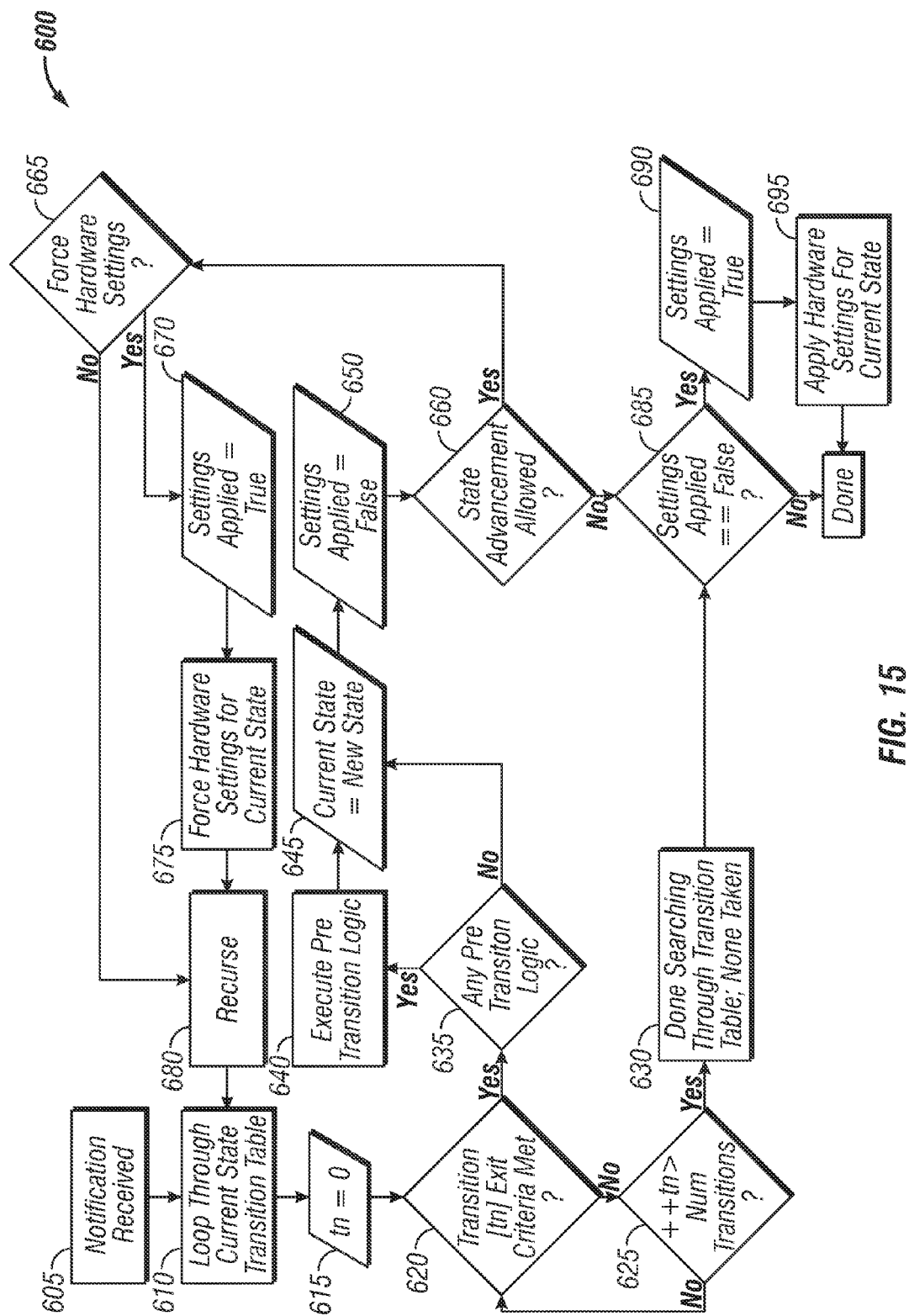
FIG. 15 illustrates a detailed flow chart of operation illustrating logical operational steps of a method for coordinating control settings with respect to the hardware-automated I/O processor, in accordance with the disclosed embodiments.

FIG. 15 illustrates a detailed flow chart of operation illustrating logical operational steps of a method 600 for coordinating control settings with respect to the automated input/output (I/O) processor, in accordance with the disclosed embodiments. The state transition tn with respect to the state machine 250 can be received, as illustrated at block 605. The state transition tn can be looped via current transition table in the state machine 250, as depicted at block 610. If tn=0, as indicated at block 615, a determination can be made whether the transition tn exit criteria is met, as illustrated at block 620. If the transition tn exit criteria is not met, another determination can be made whether ++tn is greater than Num Transitions, as indicated at block 625.

If ++tn is greater than Num Transitions, search the state transition tn through the transition table, as illustrated at block 630 and the process can be continued from block 685. If the transition tn exit criteria is met, another determination can be made whether any pre-transition logic exists, as illustrated at block 635. If pre-transition logic exists, the pre-transition logic can be executed, as indicated at block 640. If the current transition state is equal to new state and the applied settings are 'false', as illustrated at blocks 645 and 650, a determination can be made whether state advancement is permitted with respect to the state machine 250, as depicted at block 660.

If state advancement is permitted, a determination can be made whether force hardware settings exists, as illustrated at block 665. If force hardware settings exist and the applied settings are 'true', as indicated at block 670, then the force hardware settings for the current state can be applied, as illustrated at block 675. The process can then be recursively continued from block 610, as indicated at block 680. If force hardware settings do not exist, the process can then be recursively continued from block 610. If state advancement is not permitted, a determination can be made whether applied settings are 'false' with respect to the state machine 250, as indicated at block 685. If applied settings are true, the process is done. Otherwise if the applied settings are 'true', as illustrated at block 690, the hardware settings can be applied for the current state, as indicated at block 695.

The storage controller 200 described herein therefore effectively shares the I/O paths between multiple entities such as the firmware 270 and the fast path engine 240 utilizing the state machine 250. By adjusting the state machine 250, the controller design can be scaled to permit other entities with respect to the SAS controller's I/O path for processing. Such a system and method therefore effectively provides a robust and flexible design to manage large number of I/O exceptions in the automated I/O processor.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A method for coordinating control settings for an automated input/output (I/O) processor, said method comprising:

identifying at least one mode based on a behavior of a fast path engine associated with a storage controller in order to determine at least one combination with respect to a plurality of control bits associated with said fast path engine, wherein said at least one mode is assigned as a state with respect to a state machine;

configuring said state with respect to said state machine to comprise at least one of the following types of states;

an ineligible state wherein said ineligible state further comprises configuring said fast path engine and a core unit associated with said storage controller to accept a fast path I/O in order to thereafter permit said firmware to issue a device I/O to said core unit;

an active state;

a postponing state;

a postponed state;

an interleaving state;

a managing state;

a disabled state;

a managed state; and a resuming state;

determining an I/O path exception and an error condition that cause a transition between said state with respect to a firmware associated with said storage controller in order to thereafter assign said transition from one state to another state; and configuring a generic logic template to govern said transition in order to thereafter execute said logic when an event occurs thereby triggering multiple state transitions with respect to said plurality of control bits associated with said fast path engine.

2. The method of claim 1 further comprising configuring a transition algorithm in association with said state machine in order to permit said fast path engine and said firmware to safely transmit an I/O request to an I/O device.

3. The method of claim 1 further comprising permitting said firmware to transit back and forth between said at least one mode as said I/O path exception and said error condition occurs.

4. The method of claim 1 further comprising identifying and inserting at least one new input with respect to said logic associated with respect to said logic associated with said state machine when a new I/O path exception and an error condition is added to said fast path engine.

5. The method of claim 1 wherein said active state further comprises:

processing said device I/O by said fast path engine without an involvement of said firmware except indirectly through a I/O Processor Request First-In-First-Out (FIFO) of said fast path engine.

6. The method of claim 1 wherein said postponing state further comprises:

entering said postponing state when said firmware requires said fast path engine to stop transmitting said I/O to said I/O device.

7. The method of claim 1 wherein said postponed state further comprises:

postponing a pending I/O and a previously submitted I/O with respect to said fast path engine in order to permit said firmware to submit said I/O to a core unit.

8. The method of claim 1 wherein said interleaving state further comprises:

entering said interleaving state after said firmware finishes a non-automated small computer system interface (SCSI) I/O and detects a pending I/O on said fast path engine and said firmware pending I/O list.

9. The method of claim 1 wherein said managing state further comprises:
   entering said managing state when at least one outstanding task management request with respect to said I/O device increases from 0 to 1.

10. The method of claim 1 wherein said disabled state further comprises:
    entering said disabled state whenever said firmware needs to temporarily disable support of said fast path engine with respect to said I/O device due to a task management request and/or a critical I/O path exception.

11. The method of claim 1 wherein said managed state further comprises:
    entering said managed state from said disabled state when there is said at least one task management request outstanding with respect said I/O device.

12. The method of claim 1 wherein said resuming state further comprises:
    entering said resuming state when said firmware needs to resume a normal fast path engine operation.

13. The method of claim 1 further comprising transferring a shared ownership of said I/O path to and from said firmware as said I/O path exception occurs.

14. A system for coordinating control settings for an automated input/output (I/O) processor, said system comprising:
    a processor;
    a data bus coupled to said processor; and
    a computer-usable medium embodying computer code, said computer-usable medium being coupled to said data bus, said computer program code comprising instructions executable by said processor and configured for:
        identifying at least one mode based on a behavior of a fast path engine associated with a storage controller in order to determine at least one combination with respect to a plurality of control bits associated with said fast path engine, wherein said at least one mode is assigned as a state with respect to a state machine;
        configuring said state with respect to said state machine to comprise at least one of the following types of states:
            an ineligible state wherein said ineligible state further comprises configuring said fast path engine and a core unit associated with said storage controller to accept a fast path I/O in order to thereafter permit said firmware to issue a device I/O to said core unit;
            an active state;
            a postponing state;
            a postponed state;
            an interleaving state;
            a managing state;
            a disabled state;
            a managed state; and
            a resuming state;
        determining an I/O path exception and an error condition that cause a transition between said state with respect to a firmware associated with said storage controller in order to thereafter assign said transition from one state to another state; and
        configuring a generic logic template to govern said transition in order to thereafter execute said logic when an event occurs thereby triggering multiple state transitions with respect to said plurality of control bits associated with said fast path engine.

15. The system of claim 14 wherein said instructions are further configured for associating a transition algorithm with said state machine in order to permit said fast path engine and said firmware to safely transmit an I/O request to an I/O device.

16. The system of claim 14 wherein said instructions are further configured for permitting said firmware to transit back and forth between said at least one mode as said I/O path exception and said error condition occurs.

17. The system of claim 14 wherein said instructions are further configured for identifying and inserting at least one new input with respect to said logic associated with said state machine when a new I/O path exception and an error condition is added to said fast path engine.

18. A system for coordinating control settings for an automated input/output (I/O) processor, said system comprising:
    a processor;
    a data bus coupled to said processor; and
    a computer-usable medium embodying computer code, said computer-usable medium being coupled to said data bus, said computer program code comprising instructions executable by said processor and configured for:
        identifying at least one mode based on a behavior of a fast path engine associated with a storage controller in order to determine at least one combination with respect to a plurality of control bits associated with said fast path engine, wherein said at least one mode is assigned as a state with respect to a state machine;
        configuring said state with respect to said state machine to comprise at least one of the following types of states:
            an ineligible state wherein said ineligible state further comprises configuring said fast path engine and a core unit associated with said storage controller to accept a fast path I/O in order to thereafter permit said firmware to issue a device I/O to said core unit;
            an active state;
            a postponing state;
            a postponed state;
            an interleaving state;
            a managing state;
            a disabled state;
            a managed state; and
            a resuming state;
        determining an I/O path exception and an error condition that cause a transition between said state with respect to a firmware associated with said storage controller in order to thereafter assign said transition from one state to another state;
        configuring a generic logic template to govern said transition; and
        transferring a shared ownership of said I/O path to and from said firmware as said I/O path exception occurs in order to thereafter execute said logic when an event occurs thereby triggering multiple state transitions with respect to said plurality of control bits associated with said fast path engine.

* * * * *